United States Patent
Sueoka et al.

(10) Patent No.: US 6,358,619 B1
(45) Date of Patent: Mar. 19, 2002

(54) AROMATIC POLYAMIDE FILM AND MAGNETIC RECORDING MEDIUM USING IT

(75) Inventors: Masanori Sueoka, Shiga; Mitsuhiro Horiuchi; Akimitsu Tsukuda, both of Kyoto, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/331,511

(22) PCT Filed: Oct. 20, 1998

(86) PCT No.: PCT/JP98/04748

§ 371 Date: Jun. 22, 1999

§ 102(e) Date: Jun. 22, 1999

(87) PCT Pub. No.: WO99/20463

PCT Pub. Date: Apr. 29, 1999

(30) Foreign Application Priority Data

Oct. 22, 1997 (JP) .............................. 9-290047

(51) Int. Cl.[7] .............................. G11B 5/66
(52) U.S. Cl. .............................. 428/474.4; 428/475.5; 428/694 ST; 428/694 SL; 428/694 SG; 428/900
(58) Field of Search ..................... 428/694 ST, 694 SL, 428/694 SG, 900, 474.4, 475.5

(56) References Cited

FOREIGN PATENT DOCUMENTS

| JP | 3-237135 | * | 8/1990 |
| JP | 4-8763 | * | 7/1991 |

* cited by examiner

*Primary Examiner*—Leszek Kiliman
(74) *Attorney, Agent, or Firm*—Morrison & Foerster LLP

(57) ABSTRACT

The present invention is an aromatic polyamide film, which is a laminated film consisting of at least two layers, comprising an aromatic polyamide and 0.1 wt % to 10 wt % of at least one or more different polymers, being contained at least in the outermost layer (layer A) of the film, subject to the condition that the following formulae are satisfied $$0.01 \leq t/d \leq 0.5$$

$$0.05 \leq s/L \leq 1$$

where d is the thickness of the layer A ($\mu$m); t, the circle equivalent diameter of the isles of the different polymer ($\mu$m); L, the major axis of the isles ($\mu$m); and s, the minor axis of the isles ($\mu$m). The aromatic polyamide film of the present invention is especially useful an a base film of a magnetic recording medium with high productivity since it is free from the wrinkling and weaving caused at the time of film winding and excellent in abrasion resistance on the film surface.

9 Claims, No Drawings

AROMATIC POLYAMIDE FILM AND MAGNETIC RECORDING MEDIUM USING IT

TECHNICAL FIELD

The present invention relates to an aromatic polyamide film, particularly an aromatic polyamide film suitably used as a base film of a magnetic recording medium, which is free from the wrinkling and weaving caused at the time of film winding and excellent in the abrasion resistance of the film surface. The present invention also relates to a magnetic recording medium using it.

BACKGROUND ARTS

In recent years, with the progress of digital recording technology and the increased use of the technology in the external memories of computers, the demand for films suitable for thinner, higher density recordable and more highly durable magnetic recording media is intensively growing.

Aromatic polyamide films are stiffer, hence can be thinner than polyester films of polyethylene terephthalate, polyethylene naphthalate, etc. conventionally used as base films of magnetic recording media, and are suitable for large capacity magnetic recording media.

However, since aromatic polyamide films are used as thinner films for smaller devices which can effectively use such excellent properties, the wrinkling of the film roll more adversely affects the productivity and the quality of the obtained product than before. Furthermore, when a very thin magnetic layer is formed by coating or a magnetic layer is formed by vapor deposition directly on a film for achieving a higher output, the base film becomes smoother on the surface and is likely to be wrinkled, for degrading the film smoothness and the electromagnetic conversion properties due to the wrinkling.

Aromatic films improved in the wrinkling caused at the time of film winding or in temporally caused wrinkling are disclosed in Japanese Patent Laid-Open (Kokai) Nos. Hei3-119512, Hei3-114830, Hei8-230124, etc. in which the ratio of the diameter of inactive particles to the thickness of the laminate, Young's modulus, moisture absorption and winding hardness are specified in respective ranges.

However, the aromatic polyamide films improved in wrinkling by forming projections on the film surface by containing inactive particles as described above have still the following problems to be solved, under the very severe conditions required for speed-up of processing in recent years.

Firstly, since particles different in nature from aromatic polyamides such as inorganic particles or organic particles made of a crosslinked polymer are added to an aromatic polyamide, the strong inter-molecular force of the aromatic polyamide lowers the affinity between the particles and the aromatic polyamide constituting the film. As a result, the particles are likely to fall off and the film surface is likely to be abraded, to lower the abrasion resistance of the film surface, being likely to cause wrinkling.

Secondly, in the solution casting process used for forming films from aromatic polyamides, inactive particles small in inter-particle repulsion are likely to cohere. As a result, large projections are formed on the film surface, being likely to degrade the electromagnetic conversion properties or to cause dropouts when the film is used as a magnetic recording medium.

Thirdly, aromatic polyamide films are often driven to run on guide rolls and guide pins during processing or when used as final products, and since the inorganic particles and particles made of a crosslinked polymer are very hard, it can happen that guides are abraded on the surfaces, and that the produced dust is deposited on the guides and films. Especially if the guides are plastic, the repeated running or high speed running of the films is likely to cause the deposition.

As a method other than the above methods of using inactive particles, Japanese Patent Laid-Open (Kokai) No. Hei7-44857 disc loses a method of letting an aromatic polyamide contain a different aromatic polyamide lower in solubility than it, and causing the mixture to be separated in phase at the time of film formation, to form projections on the film surface.

However, an aromatic polyamide, especially a para-oriented polyamide is not excellent in solubility, and if an aromatic polyamide poor in solubility is blended with it, it is actually difficult to mix them perfectly though the polymer solution looks perfectly dissolved.

The inventors formed films from such polymer solutions for examination, and found that though fine projections also existed, there were many 150 nm or higher large projections, and that the film surfaces were rough with craters, etc. Furthermore, it can happen that if an aromatic polyamide with low solubility is precipitated in the beginning of film formation process, the film is devitrified or becomes a fragile film low in elongation. On the other hand, it was also found that if an aromatic polyamide with a structure very close to that of the main aromatic polyamide, i.e., having a solubility almost equal to that of the main aromatic polyamide is blended, few projections are formed probably because the added aromatic polyamide is perfectly mixed with the main aromatic polyamide. Therefore, it is difficult to uniformly form fine projections according to the technique disclosed in the patent gazette.

Japanese Patent Laid-Open (Kokai) No. Hei4-8763 discloses a method of adding a polyether sulfone before completion of aromatic polyamide polymerization for production of an aromatic polyamide-polyether sulfone composition, but it does not state at all the properties of the molded article (film, etc.), particularly what surface is designed and intended to be obtained.

On the other hand, Japanese Patent Laid-Open No. Hei3-237135 discloses a heat resistant film made from an aromatic polyamide and a soluble resin with the amount of the soluble resin kept at 10 wt % to 95 wt %, but it is intended to improve chemical properties and economy, without describing or suggesting any technical idea on the formation of a fine surface. Furthermore, since a soluble resin is contained more compared to an aromatic polyamide, the high mechanical properties, especially high Young's modulus peculiar to the aromatic polyamide are lost. For example, the highest Young's modulus achieved in the examples of the patent gazette is as low as 6.2GPa (Example2). Similar techniques are also disclosed in Japanese Patent Laid-Open (Kokai) Nos. Hei3-286680, Hei3-227290, Hei4-117433 and Hei4-27110, etc., but the achievements are also similar.

As polyimide films, laminated films in which a layer containing 0.01 wt % to 10 wt % of an aromatic polysulfone based polymer contained in a polyimide is laminated on one side of a film mainly made of a polyimide are disclosed in Japanese Patent Laid-Open (Kokai) Nos. Sho59-122547 and Sho62-68746, etc. However, a polyimide belongs to a technical field different from that of a polyamide since it is greatly different from a polyamide in production method and the properties of the film formed from it. For example, while a polyimide is produced by polymerization under mild conditions in an organic solvent, a polyamide is produced by polymerization under severe conditions that sulfuric acid is used as solvent or hydrogen chloride is produced during polymerization. Furthermore, since the polymer solution used for film formation contains said hydrogen chloride or its neutralization product, it is difficult to control the film surface. Moreover, if the neutralization product remains in the film, it can cause dropouts in the magnetic recording medium produced from it, and if the neutralization product is removed suddenly, the film becomes irregular in thickness. Under this technical extent, the patent gazette does not describe or suggest at all the technical idea of improving the wrinkling and weaving caused at the time of film winding.

DISCLOSURE OF THE INVENTION

The object of the present invention is to provide an aromatic polyamide film free from the wrinkling and weaving caused at the time of film winding and excellent in the abrasion resistance of the film surface because of high affinity of a contained different polymer to an aromatic polyamide, by separating the aromatic polyamide and the different polymer compatible with it in the state of a solution, from each other in micron ranges when molded, for dispersing the different polymer into the film.

The present invention is an aromatic polyamide film, which is a laminated film consisting of at least two layers, and at least one of the outermost layer (layer A) of the film comprises an aromatic polyamide and 0.1 wt % to 10 wt % of one or more different polymers, and the following formulae are satisfied $$0.01 \leq t/d \leq 0.5$$

$$0.05 \leq s/L \leq 1$$

where d is the thickness of the layer A ($\mu$m); t, the circle equivalent diameter of the isles of the different polymer ($\mu$m); L, the major axis of the isles ($\mu$m); and s, the minor axis of the isles ($\mu$m).

THE BEST EMBODIMENTS OF THE INVENTION

The aromatic polyamide of the present invention has a recurring unit represented by the following formula (I) and/or (II).

$$\text{(NH—Ar}_1\text{—NHCO—Ar}_2\text{—CO)} \tag{I}$$

$$\text{(NH—Ar}_3\text{—CO)} \tag{II}$$

where $Ar_1$, $Ar_2$ and $Ar_3$ can be, for example,

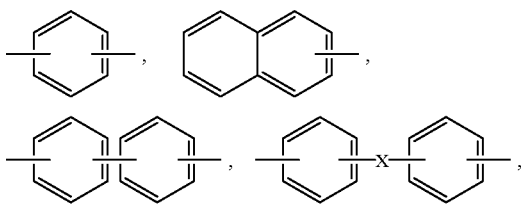

-continued

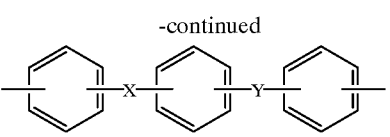

and X and Y can be selected from —O—, —CH$_2$—, —CO, —CO$_2$—, —S—, —SO$_2$—, —C(CH$_3$)$_2$—, etc. Furthermore, it is preferable that some of the hydrogen atoms of these aromatic rings are substituted by substituent groups, for example, halogen groups such as fluorine, bromine and chlorine (especially chlorine), nitro groups, alkyl groups such as methyl groups, ethyl groups and propyl groups (especially methyl groups), alkoxy groups such as methoxy groups, ethoxy groups and propoxy groups, etc., since moisture absorption can be lowered to lessen the dimensional change due to humidity change, for inhibiting the temporally caused wrinkling. Furthermore, the hydrogen atoms in the amide bonds in the polymer can also be substituted by other substituent groups.

It is preferable that 80% or more of the aromatic rings of the aromatic polyamide used in the present invention are para-oriented. More preferable is 90% or more. The para orientation in this case refers to a state that the divalent links in the main chain of the aromatic ring are coaxial or parallel to each other. When the para-oriented aromatic rings account for less than 80%, the film may be insufficient in stiffness and heat resistance.

The present invention is an aromatic polyamide laminated film consisting of at least two layers, and at least one of the outermost layer (layer A) of the film comprises an aromatic polyamide and 0.1 wt % to 10 wt % of one or more different polymers. To achieve a larger effect of wrinkling control, a range from 1 wt % to 8 wt % is preferable, and a range from 2 wt % to 7 wt % is more preferable. If the different polymer content is less than 0.1 wt %, the effect for inhibiting wrinkling cannot be sufficiently obtained. If more than 10 wt %, the Young's modulus of the film declines, and the high stiffness peculiar to an aromatic polyamide film cannot be kept, not allowing the film to withstand the high tension and tension variation caused at the time of winding.

Furthermore, the ratio (t/d) of the circle equivalent diameter t ($\mu$m) of the isles of the different polymer to the thickness d ($\mu$m) of the layer A must be 0.01 to 0.5. To achieve a larger effect of wrinkling control, a range from 0.02 to 0.3 is preferable, and a range from 0.05 to 0.2 is more preferable. If t/d is less than 0.01, the friction coefficient between the respectively adjacently overlying layers of the film wound as a roll becomes large, to generate static electricity, and hence wrinkling is likely to occur. If t/d is more than 0.5, the friction coefficient between the respectively adjacently overlying layers of the film wound as a roll becomes small, and weaving may occur.

The ratio (s/L) of the minor axis s ($\mu$m) to the major axis L ($\mu$m) of isles of the different polymer must be 0.05 to 1. To achieve a larger effect of weaving control, a range from 0.1 to 1 is preferable, and a range from 0.2 to 1 is more preferable. If s/L is less than 0.05, the friction coefficient between the respectively adjacently overlying layers of the film wound as a roll becomes small, and weaving may occur.

The different polymer contained in the layer A of the aromatic polyamide film of the present invention is selected from the polymers soluble in the solvent of the film-forming solution. In view of the affinity to the aromatic polyamide constituting the film, preferable polymers which can be used as the different polymer include polysulfone based polymers, polyether imide based polymers, polyphenylene oxide based polymers, polyester based polymers, polyketone based polymers, polycarbonate bated polymers, polyimide based polymers and their precursors. Furthermore, aromatic polysulfone based polymers having at least one sulfone group —$SO_2$— in the recurring unit such as polysulfone, specifically, known aromatic polysulfone based polymers having a recurring unit represented by the following formula (III) are preferable since the winding form becomes better.

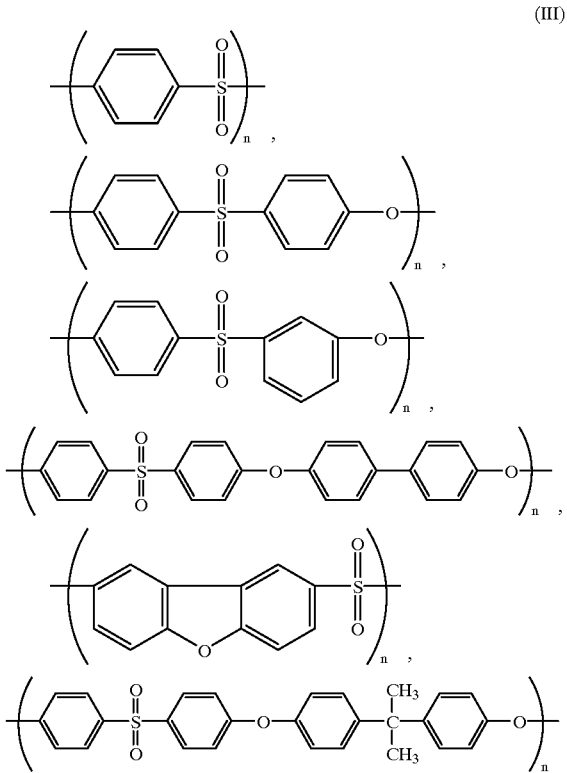

(III)

where n is a positive integer. It is preferable that n is 5 to 1000, in view of heat resistance and solubility in solvents.

It is preferable that the aromatic polyamide film of the present invention contains 0.001 wt % to 0.1 wt % of inorganic particles and/or organic particles with an average particle size of 5 nm to 200 nm in the layer A, since the winding form becomes better. Preferable inorganic particles include, for example, particles of $SiO_2$, $TiO_2$, $Al_2O_3$, $CaSO_4$, $BaSO_4$, $CaCO_3$, carbon black and zeolite, metallic powders, etc.

Preferable organic particles include, for example, particles of organic polymers such as crosslinked polyvinyl benzene, crosslinked acrylic resin, crosslinked polystyrene, polyesters, polyimides, polyamides and fluorine resin, and inorganic particles treated to be covered on the surfaces with any of said polymers.

It is also preferable that the aromatic polyamide film of the present invention contains 0.05 wt % to 5 wt % of inorganic particles and/or organic particles with an average particle size of 5 nm to 500 nm on the outermost layer (layer B) on the side opposite to the layer A, since the runnability on guide rolls and guide pins during processing and in the use as the final product becomes better. A more preferable range is 0.2 wt % to 5 wt %, and a further more preferable range is 0.3 wt % to 1 wt %. Preferable inorganic particles and organic particles are as enumerated above.

It is also preferable that the aromatic polyamide film of the present invention has $2 \times 10^6$ or more projections per square millimeter of five-nanometer or higher, $5 \times 10^3$ or more projections per square millimeter of thirty-nanometer or higher and $5 \times 10^4$ or more projections per square millimeter of fifty-nanometer or higher on the surface of the layer A, since the magnetic recording medium produced with a magnetic layer formed on the layer A becomes more excellent in electromagnetic conversion properties and in the durability to the friction with the magnetic head.

Furthermore, it is preferable that the aromatic polyamide film of the present invention is 50% or less in the thickness irregularity of the layer A in the transverse direction of the film. More preferable is 30% or less. If the thickness irregularity of the layer A in the transverse direction exceeds 50%, the film surface becomes less uniform, and if a magnetic recording medium is produced by using the film, the area in contact with the magnetic head decreases to lower the SIN ratio. Moreover, since a strong force acts at a portion of the film surface, the magnetic layer may be peeled at the portion, and curling may also occur.

The aromatic polyamide film of the present invention can be preferably used in various applications, for example, as the base film of a flexible printed circuit board, capacitor, printer ribbon, acoustic diaphragm or solar cell, etc. It is especially preferable to use the aromatic polyamide film of the present invention as a magnetic recording medium with a magnetic layer formed at least on one side, since the effect of providing both high output and high durability can be sufficiently manifested. In this case, it is preferable to form a magnetic layer on the surface of the layer A of the present invention.

The form of the magnetic recording medium is not especially limited to a disc, card or tape, etc. However, for use as a thin film with excellent surface properties and high Young's modulus peculiar to the aromatic polyamide film of the present invention, it is preferable that the aromatic polyamide film is used as a base film having a thickness of 6.5 $\mu$m or less, a width of 2.3 mm to 13.0 mm, a length of 100 m or more per roll, in a long and high density magnetic tape with a recording density (without compression) of 8 kilobytes/mm$^2$ or more as a magnetic recording medium, since the effect of the present invention to inhibit the wrinkling and weaving under severe conditions can be further manifested.

The recording density in this case is calculated from the following formula. Recording density=Recording capacity/ (Tape width×Tape length)

It is preferable that the thickness of the base film is 5.0 $\mu$m or less. More preferable is 4.0 $\mu$m or less. It is preferable that the thickness of the layer A is 0.1 $\mu$m to 3.0 $\mu$m, since the winding form becomes better. A more preferable range is 0.5 $\mu$m to 2.5 $\mu$m.

It is preferable that the recording density of the magnetic recording medium is 25 kilobytes/mm$^2$ or more. More preferable is 34 kilobytes/mm$^2$ or more.

The magnetic recording medium of the present invention can be suitably used for digital video cassettes for residential use, professional use and broadcasting of D-1, D-2, D-3, etc., and also for data storages such as DDS-2, 3 and 4, data 8 mm and QIC. It can be most suitably used for data storages where reliability against dropouts, etc. is most important.

The magnetic layer of the high density recording medium to which the film of the present invention is applied is not especially limited. However, a case of using a thin ferromagnetic metal layer as the magnetic layer is described below.

A thin ferromagnetic metal layer can be formed, for example, by vapor deposition such as oblique vapor deposition or vertical vapor deposition, and a thin magnetic metal layer mainly made of Co, Ni or Fe, etc. or any of their alloys can be used. The metals which can be used here include ferromagnetic metals such as Co, Ni and Fe, and ferromagnetic alloys such as Fe—Co, Co—Ni, Fe—Co—Ni, Fe—Cu, Co—Au, Co—Pt, Mn—Bi, Mn—Al, Fe—Cr, Co—Cr, Ni—Cr, Fe—Co—Cr, Co—Ni—Cr and Fe—Co—Ni—Cr. The layer can be a single layer or multi-layer. As for the vapor deposition method, a vacuum vapor deposition in which a ferromagnetic material is heated and evaporated in vacuum and deposited on a film is preferable. However, so-called PVD techniques can also be used. They include, for example, an ion plating method in which a ferromagnetic material is evaporated in electric discharge and a sputtering method in which glow discharge is caused in an atmosphere mainly composed of argon for sputtering atoms on the surface of a target by generated argon ions. After forming the thin magnetic metal layer, it is preferable to heat-treat at 150° C. to 250° C. for anti-curling. Furthermore, to improve the durability and weather resistance of the magnetic recording medium, a hard carbon layer can also be formed as required by a sputtering method or CVD method on the surface of the thin magnetic metal layer. Moreover, if a slippery layer is formed, the runnability based on the form of the particle projections of the magnetic material can be further improved. The slipping agents which can be used here include, for example, fatty acids and fatty acid esters. Furthermore, a back coat layer can also be formed on the surface opposite to the magnetic layer. For the back coat layer, for example, a dispersion obtained by dispersing a non-magnetic pigment such as carbon or calcium carbonate into a binder such as a polyurethane or vinyl chloride-vinyl acetate copolymer can be used.

If coating is used for forming the thin ferromagnetic metal layer, it is preferable to use multi-layer coating. The methods which can be used here include, for example, 1) a method in which at first a non-magnetic layer is formed on a support using a gravure coater, roll coater, blade coater or extrusion coater, etc., and a magnetic layer is formed by a support pressurizing type extrusion coater while the non-magnetic layer is still wet, 2) a method in which a magnetic layer and a non-magnetic layer are formed on a support almost simultaneously by using a coater having one coating head with two coating solution slits, and 3) a method in which a magnetic layer and a non-magnetic layer are formed on a support almost simultaneously by using an extrusion coater with a backup roller. In this case, it is preferable that the thickness of the magnetic layer is 0.03 to 0.3 $\mu$m, and that the thickness of the non-magnetic layer is 0.2 to 1.5 $\mu$m. Furthermore, as in the case of vapor deposition, a slippery layer may be formed on the magnetic layer, and a back coat layer may be formed on the surface opposite to the magnetic layer.

When the aromatic polyamide film of the present invention is used as a magnetic tape, it is preferable that the number of dropouts is 800 or less per minute at 1 $\mu$sec/−8 dB. If the dropouts exceed this range, there liability of the magnetic tape maybe insufficient. Magnetic tapes, especially tapes used for data storages have larger capacities in recent years, and the recording density is improved dramatically. So, slightly large projections on the film surface cause dropouts. The film of the present invention is improved in the uniformity of the film surface by specifying the thickness irregularity of the layer A.

It is preferable that the aromatic polyamide film of the present invention is 9.8 GPa or more in Young's modulus at least in one direction. A film higher in Young's modulus can withstand the higher tension and tension variation caused at the time of winding, and becomes better in winding form. It is more preferable that the Young's modulus of the aromatic polyamide film of the present invention at least in one direction is 11.7 GPa or more. Further more preferable is 12.7 GPa or more. It is also preferable that the Young's modulus in every direction is 9.8 GPa or more. To satisfy these properties, as described before, it is effective that preferably 80% or more, more preferably 90% or more of the aromatic rings of the aromatic polyamide used in the present invention are para-oriented.

It is preferable that the elongation of the film of the present invention is 10% or more, since the tape has moderate flexibility. More preferable is 20% or more, and further more preferable is 30% or more.

It is preferable that the moisture absorption percentage of the film of the present invention is 5% or less, since the wrinkling caused by humidity fluctuation can be inhibited while good electromagnetic conversion properties can be kept. More preferable is 3% or less, and further more preferable is 2% or less.

It is preferable that the heat shrinkage percentage of the film of the present invention at 200° C. for 10 minutes is 0.5% or less, since the dimensional change of the tape due to temperature fluctuation is small while good electromagnetic conversion properties can be kept. More preferable is 0.3% or less.

The film of the present invention can be wound around a core, etc., to be formed as a film roll. The material of the core is not especially limited, and any known material such as paper or plastic material can be used. A core with an outer diameter of 1 inch to 10 inches, especially 2 inches to 8 inches can be preferably used. It is preferable that the core length is 150 mm to 2000 mm, especially 500 mm to 1500 mm.

It is preferable that the winding hardness of the core is 85 to 100. A more preferable range is 90 to 100. If the winding hardness is smaller than the above range, wrinkling is likely to be caused in the transverse direction with the lapse of time, and if larger than the above range, wrinkling may be caused in the longitudinal direction.

The film of the present invention can be produced, for example, according to the following method, though the present invention is not limited thereto or thereby.

First of all, if an aromatic polyamide is obtained from an aromatic diacid chloride and an aromatic diamine, it can be synthesized by solution polymerization in an aprotic organic polar solvent such as N-methylpyrrolidone, dimethylacetamide or dimethyl formamide.

In this case, to inhibit the production of low molecular substances, the ingress of water or any other material to inhibit the reaction should be avoided, and it is preferable to adopt any efficient stirring means. Furthermore, a solubilizer such as potassium chloride, magnesium chloride, lithium chloride, lithium bromide or lithium nitrate can also be added.

If an aromatic diacid chloride and an aromatic diamine are used as monomers, hydrogen chloride is by produced, and to neutralize it, an inorganic neutralizing agent such as a salt consisting of cations of group I or II of the periodic table and anions such as hydroxide ions or carbonate ions, or an organic neutralizing agent such as ethylene oxide, propylene oxide, ammonia, triethylamine, triethanolamine or diethanolamine is used.

Furthermore, to improve the humidity properties of the base film, benzoyl chloride, phthalic anhydride, acetic acid chloride or aniline, etc. can be added to a polymerization completed system, to block the ends of the polymer.

To obtain the film of the present invention, it is preferable that the inherent viscosity of the polymer (the value of 100 ml of a solution with 0.5 g of the polymer dissolved in sulfuric acid, measured at 30° C.) is 0.5 or more.

The film-forming solution can be the polymer solution obtained after neutralization, but also be a solution obtained by once isolating the polymer and dissolving it into an organic solvent.

The different polymer can be added by dissolving it together with the monomers into a solvent before polymerization, or mixing it with the polymer solution after polymerization, or dissolving with an isolated aromatic polyamide, or mixing using a static mixer immediately before film formation. it can also be added as a powder or pellets, or can be dissolved once into an organic solvent such as a polymerization solvent, and mixed with the polymer solution.

If particles are added, it is preferable to disperse them in a solvent of 10 poises or less, desirably 1 poise or less before adding them, for ensuring homogeneous dispersion in the film. If particles are added directly into the film-forming polymer solution without being dispersed in a solvent beforehand, it can happen that the average particle size becomes large or that the grain size distribution also becomes large, to roughen the film surface. It is preferable that the solvent used is the same as that of the film-forming solution, but any other solvent can also be used as far as the film formability is not especially adversely affected. For dispersion, the particles are added into any of said solvents, and the mixture is dispersed by a stirring type disperser, ball mill, sand mill or ultrasonic disperser, etc. The particles dispersed like this are added to be mixed with the polymer solution, and in this case, it can be added to the solvent before polymerization or in the polymer solution producing step. It can also be added immediately before casting. It is preferable that the polymer concentration in the film-forming solution is about 2 to 40 wt %.

The film-forming solution produced as above is formed into a film by a dry process, dry-wet process, wet process or semi dry-semi wet process, etc., but in view of easy controllability of surface pattern, a dry-wet process is preferable. A case of a dry-wet process is described below.

The film-forming solution is extruded from a die onto a support such as a drum or endless belt, etc., to form a thin film which is then dried to scatter the solvent from the thin layer. A preferable drying temperature range is 100 to 210° C., and a more preferable range is 120 to 180° C. A preferable drying time range is 4 to 12 minutes, and a more preferable range is 5 to 10 minutes. After completion of the dry process, the film is stripped from the support and introduced into the wet process, to be desalted, desolvated, etc. If the stripped gel film is directly stretched and heat-treated without being introduced into the wet process, it can be greatly roughened on the surface or may be curled unpreferably.

Therefore, it is stretched, dried and heat-treated into a film.

The stretching conditions are especially important for keeping the different polymer of the present invention dispersed as isles as specified in the present invention.

In the present invention, to achieve $0.01 \leq t/d \leq 0.5$ and $0.05 \leq s/L \leq 1$, the stretching conditions must be set to satisfy the following relation:

$$(T-T_g) \times r \leq 500$$

where $T_g$ is the glass transition temperature of the different polymer (°C.); T, hot air temperature (°C.); and r, air velocity (m/sec).

If $(T-T_g) \times r > 500$, the ratio of (s/L) of the minor axis s ($\mu$m) to the major axis L ($\mu$m) of the isles of the different polymer may not satisfy the range specified in the present invention. It is preferable that the stretching ratio is in a range from 1.2 to 3.5 as area ratio (the area ratio is defined as a quotient obtained by dividing the film area after stretching by the film area before stretching; 1 or less means relaxing). A more preferable range is 1.2 to 3.0.

Usually heat treatment is effected during or after film stretching, and it is preferable that the heat treatment temperature is in a range from 200 to 350° C.

Gradually cooling the film after stretching or heat treatment is effective for inhibiting the wrinkling caused by heat shrinkage, and it is effective to cool at a rate of 50° C./sec or lower.

The aromatic polyamide film of the present invention is different in properties between both the surfaces of the film, to achieve both the smoothness on the surface suitable as a high density magnetic tape and the prevention of the wrinkling and weaving caused at the time of film winding. So, the film of the present invention must have a laminated structure consisting of two or more layers.

The laminated film of the present invention can be formed by laminating the film-forming solution for the layer A and the film-forming solution for the other layer than the layer A by a known method, for example, in a feed block as stated in Japanese Patent Laid-Open (Kokai) Sho56-162617 or in a die. As another method, either of the film-forming solutions can be cast on the film formed by the other film-forming solution and desolvated, to form a laminated film. In this case, the film-forming solution for the layer A is laminated to form an outermost layer, and it is preferable to laminate in such a manner that the film-forming solution for the layer A becomes the outermost layer on the side not in contact with the support such as a belt or drum, etc.

For lamination in a feed block or die, it is preferable that the film-forming solutions are adjusted to have a viscosity of 100 poises to 1000 poises. If the viscosity is smaller than this range, the solutions are likely to be mixed with each other before they are delivered from the die. On the contrary, if larger than the range, melt fracture is likely to occur, to roughen the surface.

It is preferable that the viscosities of the respective layers are equal, but there can be some difference in viscosity. If the viscosity difference is within about 50%, curling due to the difference in drying rate can be inhibited preferably.

In the case of a dry process or dry-wet process, it may happen that the respective solutions are mixed in the drying process. If the film-forming solutions cast on a support are once heated, they once decline in viscosity, and rise in viscosity with the evaporation of solvents. In this case, if the viscosity declines to lower than 10 poises, the respective solutions are likely to be mixed. So, it is preferable to sufficiently adjust the drying conditions for ensuring that the viscosity does not decline below 10 poises. It is more preferable that the viscosity does not decline below 50 poises. For example, it is effective to dry at a drying temperature not higher than 220° C., or to raise the drying temperature at least in two steps.

The mill roll of the laminated film thus obtained is set on a slitter adopting both center winding and surface winding methods, and is wound up to a predetermined length, for completion as a laminated film roll. An effective method for adjusting the winding hardness is to control the film tension and the face pressure of the contact roll in contact with the film roll at the slitter when the product roll is wound from the mill roll.

The properties of the present invention are measured according to the following methods and evaluated according to the following criteria.

(1) Thickness d ($\mu$m) of layer A, circle equivalent diameter t ($\mu$m) of isles of different polymer, major axis L ($\mu$m) of the isles, minor axis s ($\mu$m) of the isles, and thickness irregularity of layer A in the transverse direction of film Sections of a film were observed by a 20,000-fold transmission electron microscope (TEM), and the variations in the kinds and quantities of additives were observed in reference to the transmitted electron beam densities. The thickness d ($\mu$m) of the layer A was obtained as the mean value of 10 observing points.

The thickness irregularity of the layer A in the transverse direction of the film was calculated by obtaining the difference a between the maximum value and the minimum value of the thickness of the layer A, dividing it by the mean value b, and multiplying the quotient a/b by 100. In this case, the total width remaining after removing 15 mm each at both the edges of a film roll was equally divided into five strips, and the thicknesses were measured at the centers of the respectively equally divided strips.

A different polymer existed as isles in the layer A, and sections of a film were observed by a 100,000-fold TEM, and the major axis L ($\mu$m) and the minor axis s ($\mu$m) of the isles were obtained as mean values of 10 observing points.

The circle equivalent diameter t ($\mu$m) of the isles of the different polymer was obtained from the following formula:

$$t = (L+2)/2$$

(2) Height and number of projections

An atomic force microscope (AFM) was used to measure at 10 places on the surface of the layer A side under the following conditions, and the mean values were obtained.

Apparatus: Nano Scope III AFM (produced by Digital Instruments)

Cantilever: Silicon single crystal

Scanning mode: Tapping mode

Scanning range: 30 $\mu$m×30 $\mu$m

Scanning speed: 0.5 Hz

Measuring environment: 25° C. 65% relative humidity (3) Winding hardness of film roll A hardness tester (type C) produced by Kobunshi Kiki K.K. was pressed against the outside of a film roll, for measurement. The total width remaining after removing 10 mm each at both the edges of the film roll was equally divided into five strips, and the mean value was obtained. The face pressure of the contact roll was adjusted to keep the winding hardness within 90±1.

(4) Winding form

A wound film roll was visually observed, and evaluated as o when it was free from wrinkling (in the longitudinal and transverse directions) and weaving, and as x when it showed wrinkling or weaving.

(5) Initial output properties

A film with a magnetic layer formed on the surface of layer A side by vacuum vapor deposition was slit into a 6.35 mm wide and 150 m long tape, and it was installed in a cassette and recorded with 6.5 MHz sinusoidal waves at the optimum recording current. The reproduced output was measured, and the difference from that of a marketed DVC tape was referred to for evaluation according to the following criterion. $\Delta$ or better is practical level.

O: +0.5 dB or more in the difference from the standard tape $\Delta$: −0.5 dB to less than +0.5 dB in the difference from standard tape X: Less than 0.5 dB in the difference from the standard tape (6) Number of dropouts (per minute)

A tape installed in said tape cassette was recorded with 27 MHz signals by a video deck, and the signals of the tape were reproduced. The number of dropouts at 1 $\mu$sec/−8 dB was counted for 20 minutes by a dropout counter produced by Ohkura Industry K.K., to calculate the number of dropouts per minute.

(8) Durability

In an atmosphere of 25° C. and 55% RH, the tape obtained in said (5) was driven to run on a guide pin with an outer diameter of 6 mm at an angle of $\theta=\pi/2$ (rad) at an inlet tension of T1=200 g at a speed of 1000 m/min 100 times, and the output properties were measured and evaluated according to the following criterion. $\Delta$ or better is practical level.

O: Less than 1 dB in the difference from initial output properties $\Delta$: 1 dB to less than 3 dB in the difference from initial output properties X: 3 dB or more in the difference from initial output properties (9) Runnability A ½-inch wide tape obtained by slitting a film was driven to run in an atmosphere of 40° C. and 48% RH using a tape runnability tester SFT-700 (produced by K.K. Yokohama System Kenkyusho), and the friction coefficient at the 50th pass was obtained from the following formula.

$$\mu K = 0.733 \log(T2/T1)$$

where T1 is inlet tension and T2 is outlet tension. The diameter of the guide was 6 mm, and the material of the guide was polyoxymethylene (about 20 to 40 nm in surface roughness). The contact angle was 90°, and the running speed was 3.3 cm/sec. The repeated stroke was 15 cm. The runnability was evaluated according to the following criterion. $\Delta$ or better is practical level.

O: $|(\mu K(100) - \mu K(1))/\mu k(1)| \leq 0.05$ $\Delta$: $0.5 < |(\mu K(100) - \mu K(1))/\mu k(1)| \leq 1.0$ X: $|(\mu K(100) - \mu K(1))/\mu k(1)| > 1.0$ where $\mu K(1)$ is the 1st measured value obtained according to the above method, and $\mu K(100)$, the 100th measured value.

The present invention is described below more concretely based on examples. In the following examples, NMP stands for N-methylpyrrolidone, CTPC, 2-chloroterephthalic acid chloride, CPA, 2-chloroparaphenylenediamine, and DPE, 4,4'-diaminodiphenyl ether.

The following different polymers were used.

Polycarbonate (PC) produced by Idemitsu Sekiyu Kagaku K.K.: Grade FN3000A, molecular weight 30200, glass transition temperature 150° C., powder Kerimide (bismaleimide resin) produced by Asahi Ciba K.K.: Grade 601, glass transition temperature higher than 300° C. (when crosslinked), powder Polyethersulfone (PES) produced by Mitsui Toatsu Chemicals, Inc.: Grade E2010, reduced viscosity 0.41, glass transition temperature 230° C., pellets All the aromatic polyamide films were formed to be 4.4 $\mu$m in total thickness.

EXAMPLE 1

CPA in an amount corresponding to 90 mol% and DPE in an amount corresponding to 10 mol% were dissolved in dehydrated NMP, and CTPC in an amount corresponding to 98.5 mol% was added to the solution. The mixture was stirred for 2 hours for polymerization, and the reaction product was neutralized by lithium carbonate, to obtain an aromatic polyamide solution with a polymer content of 11 wt %.

Dried PC was added to dehydrated NMP, for dissolution to achieve a concentration of 20 wt %, and the solution was filtered. The PC solution was added to the aromatic polyamide solution, to achieve a PC content of 3 wt % based on the weight of the aromatic polyamide.

On the other hand, 20 wt % of silica with a primary particle size of 45 nm was added into dehydrated NMP, and dispersed by an ultrasonic disperser for 10 minutes by an ultrasonic disperser, and the dispersion was filtered. The particle solution was added to the monomer solution not yet polymerized, to achieve a silica content of 1.8 wt % based on the weight of the aromatic polyamide, and the mixture was polymerized as described above, to obtain an aromatic polyamide solution.

The two polymer solutions produced as described above were supplied to a die by two extruders, and laminated in two layers in the die, being cast on a stainless steel belt with a mirror finished surface. The PC-containing solution (for the layer A) was kept on the side not in contact with the belt, and the silica particle-containing solution (for the layer B) was kept on the side in contact with the belt. The extruded amounts were adjusted to keep the layer A thickness at 3.3 $\mu$m and the layer B thickness at 1.1 $\mu$m in the final film. The cast polymer solutions were heated by 160° C. air and then by 180° C. air respectively for one minute each, to evaporate the solvent, and the film was passed through a water tank for 2 minutes, to extract the inorganic salts produced by neutralization with the remaining solvent by water. During the period, the film was stretched to 1.2 times in the longitudinal direction. Then, it was stretched to 1.3 times in the transverse direction of the film at 220° C. and an air velocity of 5 m/sec in a tenter and heat-treated at 240° C. for 1.5 minutes, to obtain an aromatic polyamide film with a total thickness of 4.4 $\mu$m. It was set in a slitter with both a center winder and a surface winder, and slit at a width of 600 mm, being wound around a plastic core with an outer diameter of 6 inches up to a length of 6000 m with the winding hardness kept within 90±1.

The winding form was observed and found good. The film was slit into a magnetic tape which was evaluated according to the above methods, and the results were as shown in Table 2. In general judgment, the tape was found practical as a magnetic recording medium.

EXAMPLE 2

The aromatic polyamide solution for the layer A was produced as described for Example 1, except that Kerimide was added as the different polymer by 4 wt % based on the weight of the aromatic polyamide.

A film was formed as described for Example 1, except that the thickness of the layer A was 0.8 $\mu$m, and that stretching was effected at a tenter air temperature of 270° C. and an air velocity of 13 m/sec.

The winding form was observed and found good. The film was slit into a magnetic tape which was evaluated according to the above methods, and the results were as shown in Table 2. In general judgment, the tape was found practical as a magnetic recording medium.

EXAMPLE 3

Twenty weight percent of silica with a primary particle size of 80 nm was added into dehydrated NMP, and dispersed by an ultrasonic disperser for 10 hours, and the dispersion was filtered. The particle solution was added to the monomer solution not yet polymerized, to achieve a silica content of 0.05 wt % based on the weight of the aromatic polyamide, and polymerization was effected as described for Example 1. Dried PES was dissolved into dehydrated NMP to achieve aPES content of 20 wt %, and the solution was filtered. The PES solution was added to said aromatic polyamide solution to achieve a PES content of 3 wt % based on the weight of the aromatic polyamide, to produce a solution for the layer A.

On the other hand, 20 wt % of silica with a primary particle size of 80 nm was added into dehydrated NMP, and dispersed by an ultrasonic disperser for 10 minutes, and the dispersion was filtered. The particle solution was added to the monomer solution not yet polymerized, to achieve a silica content of 0.5 wt % based on the weight of the aromatic polyamide, and polymerization was effected as described before, to obtain an aromatic polyamide solution for the layer B.

A film was formed as described for Example 1, except that the thickness of the layer A was 2.2 $\mu$m and that stretching was effected at a tenter air temperature of 250° C. and an air velocity of 5 m/sec.

The winding form was observed and found good. Furthermore, the film was slit into a magnetic tape which was evaluated according to the above methods, and the results were as shown in Table 2. In general judgment, the film was found practical as a magnetic recording medium.

EXAMPLE 4

A film was formed as described for Example 3, except that the silica added for the layer B had a primary particle size of 45 nm and was added by 1.8 wt % based on the weight of the aromatic polyamide (stretching was effected at a tenter air temperature of 250° C., an air velocity of 5 m/sec and a ratio of 1.3 times).

The winding form was observed and found good. Furthermore, the film was slit into a magnetic tape which was evaluated according to the above methods, and the results were as shown in Table 2. In general judgment, the tape was found excellent as a magnetic recording medium.

EXAMPLE 5

A film was formed as described for Example 3, except that PES was added by 6 wt % based on the weight of the aromatic polyamide, while silica with a primary particle size of 80 nm was added by 0.08 wt % based on the weight of the aromatic polyamide for the layer A, that the silica added for the layer B had a primary particle size of 80 nm and was added by 1.2 wt % based on the aromatic polyamide, and that the thickness of the layer A was 1.0 $\mu$m (stretching was effected at a tenter air temperature of 250° C., an air velocity of 5 m/sec and a ratio of 1.3 times).

The winding form was observed and found good. Furthermore, the film was slit into a magnetic tape which was evaluated according to the above methods, and the results were as shown in Table 2. In general judgment, the tape was found excellent as a magnetic recording medium.

EXAMPLE 6

A film was formed as described for Example 3, except that Kerimide was added by 2 wt % based on the weight of the aromatic polyamide, while silica with a primary particle size of 80 nm was added by 0.02 wt % based on the weight of the aromatic polyamide for the layer A, that the silica added for the layer B had a primary particle size of 120 nm and was added by 0.3 wt % based on the weight of the aromatic polyamide, that the thickness of the layer A was 3.0 μm, and that stretching was effected at a tenter air temperature of 270° C., an air velocity of 13 m/sec and a ratio of 1.4 times.

The winding form was observed and found good. Furthermore, the film was slit into a magnetic tape which was evaluated according to the above methods, and the results were as shown in Table 2. In general judgment, the film was found excellent as a magnetic recording medium.

EXAMPLE 7

PES was added by 8 wt % based on the weight of the aromatic polyamide, while silica with a primary particle size of 80 nm was added by 0.05 wt % based on the weight of the aromatic polyamide for the layer A. The silica added for the layer B had a primary particle size of 45 nm and was added by 1.8 wt % based on the weight of the aromatic polyamide.

Furthermore, the film obtained in Example 4 was finely ground, and added to an NMP solution to achieve a polymer content of 10 wt %. Furthermore, lithium chloride was added to achieve a content of 25 wt % based on the weight of the polymer. The mixture was stirred at 60° C. for 8 hours, to obtain a homogeneous solution. The solution was passed through a 5 μm cut filter, to obtain a solution for layer C.

A film was formed as described for Example 3, except that a feed block for three-layer lamination was used to let the solution for the layer C form an intermediate layer, with the thickness of the layer A kept at 0.6 μm and the thickness of the layer B at 2.2 μm, and that stretching was effected at a tenter air temperature of 250° C., an air velocity of 5 m/sec and a ratio of 1.5 times.

The winding form was observed and found good. Furthermore, the film was slit into a magnetic tape which was evaluated according to the above methods, and the results were as shown in Table 2. In general judgment, the tape was found excellent as a magnetic recording medium.

COMPARATIVE EXAMPLE 1

A film was formed as described for Example 3, except that PES was added by 0.05 wt % based on the weight of the aromatic polyamide, while silica with a primary particle size of 80 nm was added by 0.05 wt % based on the weight of the aromatic polyamide for the layer A, and that the silica used for the layer B had a primary particle size of 45 nm and was added by 1.8 wt % based on the weight of the aromatic polyamide (stretching was effected at a tenter air temperature of 250° C., an air velocity of 5 m/sec and a ratio of 1.3 times).

The winding form was observed and found poor. Furthermore, the film was slit into a magnetic tape which was evaluated according to the above methods, and the results were as shown in Table 2. In general judgment, the tape was found impractical as a magnetic recording medium.

COMPARATIVE EXAMPLE 2

A film was formed as described for Example 3, except that PES was added by 30 wt % based on the weight of the aromatic polyamide, while silica with a primary particle size of 80 nm was added by 0.05 wt % based on the weight of the aromatic polyamide for the layer A, and that the silica used for the layer B had a primary particle size of 45 nm and was added by 1.8 wt % based on the weight of the aromatic polyamide (stretching was effected at a tenter air temperature of 250° C., air velocity of 5 m/sec and a ratio of 1.3 times).

The winding form was observed and found poor. Furthermore, the film was slit into a magnetic tape which was evaluated according to the above methods, and the results were as shown in Table 2. In general judgment, the tape was found impractical as a magnetic recording medium.

COMPARATIVE EXAMPLE 3

A film was formed as described for Example 3, except that PC was added by 1 wt % based on the weight of the aromatic polyamide, while silica with a primary particle size of 80 nm was added by 0.05 wt % based on the weight of the aromatic polyamide for the layer A, that the silica used for the layer B had a primary particle size of 80 nm and was added by 0.02 wt % based on the weight of the aromatic polyamide, that the thickness of the layer A was 3.1 μm, and that stretching was effected at a tenter air temperature of 270° C., an air velocity of 5 m/sec and a ratio of 1.3 times.

The winding form was observed and found poor. Furthermore, the film was slit into a magnetic tape which was evaluated according to the above methods, and the results were as shown in Table 2. In general judgment, the tape was found impractical as a magnetic recording medium.

COMPARATIVE EXAMPLE 4

A film was formed as described for Example 3, except that PES was added by 3 wt % based on the weight of the aromatic polyamide, while silica with a primary particle size of 80 nm was added by 0.05 wt % based on the weight of the aromatic polyamide for the layer A, that the silica for the layer B had a primary particle size of 45 nm and was added by 1.8 wt % based on the weight of the aromatic polyamide, and that stretching was effected at a tenter air temperature of 280° C., an air velocity of 16 m/sec and a ratio of 1.5 times.

The winding form was observed and found poor. Furthermore, the film was slit into a magnetic tape which was evaluated according to the above methods, and the results were as shown in Table 2. In general judgment, the tape was impractical as a magnetic recording medium.

COMPARATIVE EXAMPLE 5

A film was formed as described for Example 3, except that no different polymer was added, while silica with a primary particle size of 80 nm was added by 0.05 wt % based on the weight of the aromatic polyamide for the layer A, and that the silica used for the layer B had a primary particle size of 45 nm and was added by 1.8 wt % based on the weight of the aromatic polyamide (stretching was effected at a tenter air temperature of 250° C., an air velocity of 5 m/sec and a ratio of 1.3 times).

The winding form was observed and found poor. Furthermore, the film was slit into a magnetic tape which was evaluated according to the above methods, and the results were as shown in Table 2. In general judgment, the tape was found impractical as a magnetic recording medium.

COMPARATIVE EXAMPLE 6

A film was formed as described for Example 3, except that no different polymer was added, while silica with a primary particle size of 45 nm was added by 1.8 wt % based on the weight of the aromatic polyamide for the layer A, and that the silica used for the layer B had a primary particle size of 45 nm and was added by 1.8 wt % based on the weight of the aromatic polyamide (stretching was effected at a tenter air temperature of 250° C., an air velocity of 5 m/sec and a ratio of 1.3 times).

The winding form was observed and found good. However, when the magnetic tape obtained by slitting the film was evaluated according to the above methods, it caused very many dropouts as shown in Table 2. In general judgment, the tape was found impractical as a magnetic recording medium.

COMPARATIVE EXAMPLE 7

A film was formed as described for Example 3, except that no different polymer was added, while crosslinked polystyrene with a primary particle size of 120 nm was added by 0.05 wt % based on the weight of the aromatic polyamide for the layer A, and that the silica used for the layer B had a primary particle size of 45 nm and was added by 1.8 wt % based on the weight of the aromatic polyamide (stretching was effected at a tenter air temperature of 250° C., an air velocity of 5 m/sec and a ratio of 1.3 times).

The winding form was observed and found poor. The film was slit into a magnetic tape which was evaluated according to the above methods. As shown in Table 2, it caused very many dropouts. In general judgment, the tape was found impractical as a magnetic recording medium.

TABLE 1

| | | Layer A | | | | | | |
|---|---|---|---|---|---|---|---|---|
| | | Different polymer | | | | | Thickness | |
| | Laminate structure | Kind | Content (wt %) | t (μm) | s/L | d (μm) | irregularity (%) | t/d |
| Example 1 | A/B | PC | 3 | 0.09 | 0.1 | 3.3 | 18 | 0.03 |
| Example 2 | A/B | Kerimide | 4 | 0.35 | 0.9 | 0.8 | 13 | 0.44 |
| Example 3 | A/B | PES | 3 | 0.08 | 0.3 | 2.2 | 12 | 0.04 |
| Example 4 | A/B | PES | 3 | 0.08 | 0.3 | 2.2 | 19 | 0.04 |
| Example 5 | A/B | PES | 6 | 0.16 | 0.5 | 1.0 | 15 | 0.16 |
| Example 6 | A/B | Kerimide | 2 | 0.19 | 0.9 | 3.0 | 23 | 0.06 |
| Example 7 | A/C/B | PES | 8 | 0.22 | 0.3 | 0.6 | 12 | 0.37 |
| Comparative Example 1 | A/B | PES | 0.05 | 0.01 | 0.2 | 2.2 | 15 | 0.005 |
| Comparative Example 2 | A/B | PES | 30 | 1.3 | 0.9 | 2.2 | 13 | 0.59 |
| Comparative Example 3 | A/B | PC | 1 | 0.02 | 0.04 | 3.1 | 11 | 0.006 |
| Comparative Example 4 | A/B | PES | 3 | 0.07 | 0.03 | 2.2 | 12 | 0.03 |
| Comparative Example 5 | A/B | — | — | — | — | 2.2 | 15 | — |
| Comparative Example 6 | A/B | — | — | — | — | 2.2 | 22 | — |
| Comparative Example 7 | A/B | — | — | — | — | 2.2 | 19 | — |

| | Layer A | | | | | Layer B | |
|---|---|---|---|---|---|---|---|
| | Particles | | Number of projections (×10$^4$/mm$^2$) | | | Particles | |
| | Size (nm) | Content (wt %) | 5 nm or higher | 30 nm or higher | 50 nm or higher | Size (nm) | Content (wt %) |
| Example 1 | — | — | 400 | 0 | 0 | 45 | 1.8 |
| Example 2 | — | — | 320 | 5.2 | 0.10 | 45 | 1.8 |
| Example 3 | 80 | 0.05 | 450 | 1.8 | 0.18 | 80 | 0.5 |
| Example 4 | 80 | 0.05 | 480 | 2.0 | 0.24 | 45 | 1.8 |
| Example 5 | 80 | 0.08 | 620 | 3.2 | 0.32 | 80 | 1.2 |
| Example 6 | 80 | 0.02 | 280 | 1.2 | 0.12 | 120 | 0.3 |
| Example 7 | 80 | 0.05 | 820 | 1.8 | 0.24 | 45 | 1.8 |
| Comparative Example 1 | 80 | 0.05 | 20 | 2.0 | 0.24 | 45 | 1.8 |
| Comparative Example 2 | 80 | 0.05 | 70 | 4.3 | 0.22 | 45 | 1.8 |
| Comparative Example 3 | 80 | 0.05 | 30 | 1.8 | 0.28 | 80 | 0.02 |
| Comparative Example 4 | 80 | 0.05 | 40 | 1.8 | 0.24 | 45 | 1.8 |
| Comparative Example 5 | 80 | 0.05 | 8 | 2.6 | 0.44 | 45 | 1.8 |
| Comparative Example 6 | 45 | 1.80 | 140 | 100 | 12 | 45 | 1.8 |
| Comparative Example 7 | 120 | 1.00 | 120 | 50 | 18 | 45 | 1.8 |

TABLE 2

| | Winding form | Initial output properties | Dropouts | Durability | Runnability |
|---|---|---|---|---|---|
| Example 1 | ○ | ○ | 50 | Δ | ○ |
| Example 2 | ○ | Δ | 200 | Δ | ○ |
| Example 3 | ○ | ○ | 80 | ○ | Δ |
| Example 4 | ○ | ○ | 70 | ○ | ○ |
| Example 5 | ○ | ○ | 50 | ○ | ○ |
| Example 6 | ○ | ○ | 100 | ○ | ○ |
| Example 7 | ○ | ○ | 50 | ○ | ○ |
| Comparative Example 1 | x | ○ | 70 | x | ○ |
| Comparative Example 2 | x | x | 90 | x | ○ |
| Comparative Example 3 | x | ○ | 70 | x | x |
| Comparative Example 4 | x | ○ | 70 | x | ○ |
| Comparative Example 5 | x | Δ | 100 | x | ○ |
| Comparative Example 6 | ○ | x | 950 | x | ○ |
| Comparative Example 7 | x | x | 1050 | x | ○ |

Industrial Availability

The present invention is an aromatic polyamide film free from the wrinkling and weaving caused at the time of film winding, high in the affinity of a different polymer to an aromatic polyamide and excellent in the abrasion resistance of the film surface, by separating the aromatic polyamide and the different polymer compatible with it in the state of a solution, in micron ranges when molded, for dispersing the different polymer in the film. The film can be effectively used for magnetic recording media.

What is claimed is:

1. An aromatic polyamide film, which is a laminated film comprising at least two layers, and at least one of the outermost layer (layer A) of the film comprises an aromatic polyamide and 0.1 wt % to 10 wt % of one or more different polymers, and the following formulae are satisfied $$0.01 \leq t/d \leq 0.5$$

$$0.05 \leq s/L \leq 1$$

where d is the thickness of the layer A ($\mu$m); t is the circle equivalent diameter of the isles of the different polymer ($\mu$m); L is the major axis of the isles ($\mu$m); and s is the minor axis of the isles ($\mu$m).

2. An aromatic polyamide film, according to claim 1, wherein the outermost layer (layer B) on the side opposite to the layer A contains 0.05 wt % to 5 wt % of inorganic particles and/or organic particles with an average particle size of 5 nm to 500 nm.

3. An aromatic polyamide film, according to claim 1 or 2, wherein the layer A contains 0.001 wt % to 0.1 wt % of inorganic particles and/or organic particles with an average particle size of 5 nm to 200 nm.

4. An aromatic polyamide film, according to claim 1, wherein the different polymer is at least one selected from polysulfone based polymers, polyether imide based polymers, polyphenylene oxide based polymers, polyester based polymers, polyketone based polymers, polycarbonate based polymers, polyimide based polymers and their precursors.

5. An aromatic polyamide film, according to claim 1, wherein the layer A has $2 \times 10^6$ or more projections per square millimeter of five-nanometer or higher, $5 \times 10^3$ or more projections per square millimeter of thirty-nanometer or higher and $5 \times 10^4$ or more projections per square millimeter of fifty-nanometer or higher on the surface.

6. An aromatic polyamide film, according to claim 1, wherein the thickness irregularity of the layer A in the transverse direction of the film is 50% or less.

7. A magnetic recording medium comprising a magnetic layer formed at least on one side of the aromatic polyamide film stated in any one of claims 1, 2, 4, 5 or 6.

8. A magnetic tape, comprising the magnetic recording medium stated in claim 7, with a width of 2.3 to 13 mm, a support thickness of 6.5 $\mu$m or less, a length of 100 m/roll or longer, and a recording density of 8 kilobytes/mm$^2$ or more as the magnetic recording medium.

9. A magnetic tape, according to claim 8, wherein the number of dropouts at 1 $\mu$sec/−8 dB as the magnetic recording medium is 800 or less per minute.

* * * * *